United States Patent [19]
Johns et al.

[11] Patent Number: 4,581,274
[45] Date of Patent: Apr. 8, 1986

[54] CARPET UNDERLAY HAVING PAD AND PERFORATED PLASTIC FILM

[75] Inventors: G. Michael Johns, Chester, Va.; Donald F. Stewart, Whippany; Harold W. Tuller, Long Valley, both of N.J.

[73] Assignee: Allied Corporation, Morris Township, Morris County, N.J.

[21] Appl. No.: 637,710

[22] Filed: Aug. 6, 1984

Related U.S. Application Data

[63] Continuation of Ser. No. 519,220, Aug. 3, 1983, abandoned, which is a continuation of Ser. No. 331,038, Dec. 19, 1981, abandoned.

[51] Int. Cl.⁴ .............................................. B32B 3/02
[52] U.S. Cl. ..................................... 428/95; 428/137; 428/138
[58] Field of Search ........................ 428/95, 137, 138

[56] References Cited

U.S. PATENT DOCUMENTS 4,251,583 2/1981 Donachiue .......................... 428/137

Primary Examiner—Marion C. McCamish
Attorney, Agent, or Firm—Patrick L. Henry; Richard A. Negin; Richard A. Anderson

[57] ABSTRACT

Carpet underlaying comprising perforated nylon film bonded to pad, provided for slippage between the carpet and the pad during installation, and minimal noise when the carpet is walked on.

10 Claims, 2 Drawing Figures

CARPET UNDERLAY HAVING PAD AND PERFORATED PLASTIC FILM

This application is a continuation of application Ser. No. 519,220 filed 8/3/83, now abandoned, which is a continuation of application Ser. No. 331,038 filed 12/19/81 now abandoned.

BACKGROUND OF THE INVENTION

This invention relates to underlays for carpets and the combination of the underlays and the carpet.

It is known in the art to provide pads to underlay carpets to provide a soft cushioned effect. One problem encountered in laying carpet over pads is that the carpet tends to stick to the pad during installation due to the frictional force between the two. One solution to this problem is to provide a loosely woven or non-woven scrim fabric between the pad and the carpet to reduce this friction.

However, this fabric has marginal flame retardant properties; and the potential for even tighter regulation in the area of building materials poses a threat to this solution.

Nylon film has very good slip characteristics, good heat seal adhesion to foam padding and excellent flame retardant properties, but produces a crinkling sound, similar to that produced by crumpling paper, when the carpet is walked on.

It is one object of this invention to provide an improved pad-film combination which will overcome the above-noted deficiencies while retaining the desired slip, adhesion and flame retardant characteristics.

Other objects and features of the invention will become apparent from the following specification.

SUMMARY OF THE INVENTION

The invention accordingly comprises a quiet carpet underlay comprising: a pad; and a perforated plastic film overlaying said pad; said film being perforated with holes having an average diameter ranging from 0.001 to 0.5 inches and a density ranging from 3 to 100,000 holes per square inch. In a presently preferred embodiment, the film is made from nylon and the ratio of: (a) the Percent Open Area encompassed by the holes to (b) the hole diameter (expressed as number of holes per square inch) is above about 140.

DETAILED DESCRIPTION OF THE INVENTION

The invention is more clearly illustrated in the following description in which.

Figure 1:
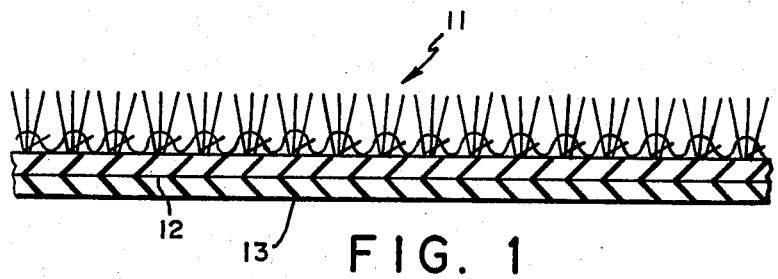
FIG. 1 illustrates a cross-section of the padfilm underlay-carpet combination of this invention.

FIG. 1 shows a cross-section of a carpet and underlay construction, comprising conventional carpet 11, peforated nylon film underlay 12 and foam pad 13.

Figure 2:
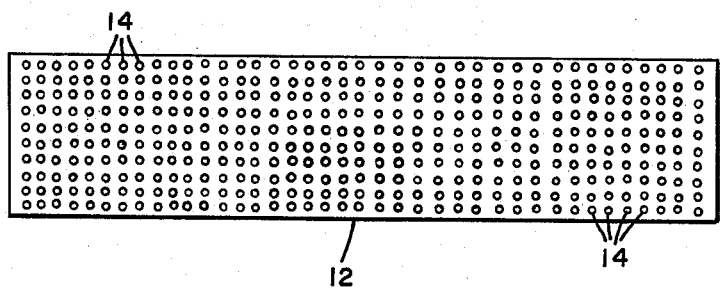
FIG. 2 is a plan view of the pad covered by the film underlay showing the holes punched in the film.

As can be seen from FIG. 2, the film 12 has a series of holes 14 distributed generally uniformly through the film 12.

These holes or perforations are preferably round, having a diameter ranging from 0.001 to 0.5 inches, preferably 0.010 to 0.045 inches, and a density ranging from 3 to 100,000, preferably 100 to 400 holes per square inch.

The film should range in thickness from 0.00025 to 0.010 inches, preferably 0.0004 to 0.001 inches.

Surprisingly, we have found that not only the hole size and density are critical factors, but also the ratio of the Percent Open Area of the film to the hole diameter. This calculation can be found from the following formula:

$$\text{Ratio} = \frac{\text{Percent Open Area}}{D} = \frac{100 \left( \frac{\pi D^2}{4} \right) (\text{Density})}{D}$$

wherein "D" is the average diameter of the holes expressed in inches and Density is the hole density expressed in number of holes per square inch.

As can be seen from the following examples, there is a definite relationship between this ratio and the noise generated by pressure simulating the walking of someone on the carpet. In these examples, holes of various sizes and density were punched in a film laminated to a foam pad and the film pad sample "crinkled" to simulate walking. The noise level was estimated empircally on a scale of 0–10 with 10 representing the loudest noise generated by an unpunched film and 0 representing essentially no noise generated by the crinkling. From these examples it can be seen that as the ratio of the "Percent Open Area" to the "Hole Diameter" increases the noise level gets lower. A noise level above 7 is considered unacceptable with the preferred level being below 2–3. Based on this correlation, we find tht the Ratio of the Percent Open Area to the hole diameter (D) should be above about 128, preferably above about 140, and more preferably above about 240.

In the following Examples, a 0.0006 inch nylon film was formed with hole sizes and densities as indicated.

The film was bonded to foam backing which was then "crinkled" to simulate walking and noise level recorded on a scale of 0–10.

TABLE I

| Ex. | Hole Diameter in Inches | Hole Density (No. of Holes per in².) | % Open Area (100 × Den. × Cross Sec. of each Hole) | % Open Area divided by hole diameter | Noise Rating |
|---|---|---|---|---|---|
| Comp. 1 | unmodified nylon film | | | | |
| Ex. 1 | .045" | 113 | 16% | 399 | 0 |
| Comp. 2 | .010" | 100 | .8% | 79 | 8 |
| Ex. 2 | .010" | 200 | 1.4% | 157 | 5 |
| Ex. 3 | .010" | 300 | 2.3% | 236 | 2 |
| Ex. 4 | .010" | 400 | 3.1% | 314 | 0 |
| Ex. 5 | .016" | 256 | 2.9% | 241 | 0 |
| Comp. 3 | .100" | 16 | 12.8% | 126 | 7 |
| Ex. 6 | .100" | 20 | 16% | 157 | 5 |
| Ex. 7 | .100" | 25 | 20% | 196 | 3 |
| Comp. 4 | .156" | 1 | 1.9% | 12 | 10 |
| Comp. 5 | .156" | 5 | 9.5% | 61 | 9 |
| Ex. 8 | .156" | 9 | 17.1% | 110 | 5 |
| Ex. 9 | .156" | 16 | 30% | 196 | 3 |
| Ex. 10 | .016" | 64 | .7% | 60 | 5 |

While hole area has been expressed as a function of diameter "D" in this case, it is understood that the theory is equally applicable to apertures or holes of any cross-section configuration. In cases other than circular cross-sections, the diameter "D" would be the average diameter, such as the average between the longest and the shortest axis in the case of an ellipse or a rectangle.

Although nylon is the preferred plastic material because of its fire retardant characteristics and adhesion to foam pad properties, other plastic films of high noise level could be used in non-critical applications. Examplatory of these are polypropylene, polyester, polyvinyl chloride and others.

What is claimed is:

1. A carpet underlay comprising:
   a pad; and
   a perforated plastic film overlaying said pad; said film being perforated with holes having an average diameter ranging from 0.001 to 0.5 inches and a density ranging from 3 to 100,000 holes per square inch, and wherein the ratio of Percent Open Area encompassed by the holes to hole diameter (D) is above 128.
2. The carpet underlay of claim 1 wherein the film is nylon.
3. The carpet underlay of claim 2 wherein the film thickness is between 0.00025 and 0.010 inches.
4. The carpet underlay of claim 3 wherein the film thickness is between 0.0004 and 0.001 inches.
5. The carpet underlay of claim 2 wherein the density ranges from 100–400 holes per square inch, and the hole diameter ranges from 0.010 to 0.045 inches.
6. The carpet underlay of claim 5 wherein the ratio of Percent Open Area encompassed by the holes to the hole diameter (D) is above about 140.
7. The carpet underlay of claim 1 wherein the ratio of Percent Open Area encompassed by the holes to the hole diameter (D) is above about 240.
8. The carpet underlay of claim 1 wherein the plastic film is bonded to the pad.
9. The carpet underlay of claim 8 wherein the plastic film is nylon.
10. A carpet and underlay construction comprising:
    a carpet;
    a pad; and
    a perforated plastic film overlaying the pad and between the pad and the carpet, the film being perforated with holes having an average diameter ranging from 0.001 to 0.5 inches and a density ranging from 3 to 100,000 holes per square inch, and wherein the ratio of Percent Open Area encompassed by the holes to hole diameter (D) is above 128.

* * * * *